March 28, 1950 H. E. HAYNES 2,502,218

FACSIMILE SYSTEM WITH REGULATED POWER SUPPLY

Filed Dec. 26, 1946

INVENTOR
Harold E. Haynes
BY H. G. Grover
ATTORNEY

Patented Mar. 28, 1950

2,502,218

UNITED STATES PATENT OFFICE 2,502,218

FACSIMILE SYSTEM WITH REGULATED POWER SUPPLY

Harold E. Haynes, Audubon, N. J., assignor to Radio Corporation of America, a corporation of Delaware Application December 26, 1946, Serial No. 718,375

4 Claims. (Cl. 178—6.6)

The present invention relates to power supplies and more particularly, but not necessarily exclusively, to a high voltage power supply, the output voltage of which is controllable in a novel manner for supplying operating voltages for light sensitive electronic devices such as electron multiplier phototubes and the like whereby to vary amplification.

In accordance with the invention, a very small voltage change controls the high voltage output of a power supply device in a novel manner. In combination with an electron multiplier phototube, the controllable power supply of this invention serves as a sensitive automatic gain control. Where the small control voltage is derived as a result of scanning recurrent portions of the subject copy in a facsimile system, a definite response level of the system to these recurrent portions may be maintained. For example, in the embodiment selected for illustrating the controllable power supply of the invention combined with an electron multiplier phototube, a predetermined quantity of light, when directed in an appropriate manner for scanning a copy area of definite shade, should produce a certain output current in the scanning phototube. Where the subject matter to be scanned is printed or inscribed on a substantially white piece of paper, then white may be selected as the reference level.

The present invention in the aspect thereof which deals with the combination of a controllable power supply and an electron multiplier phototube is an improvement on the apparatus disclosed and claimed in a copending application of the present inventor for Letters Patent for "Gain control system for facsimile scanning," filed October 31, 1946, Serial No. 706,924.

An important object of the present invention is to provide a novel power supply system, the voltage output of which is readily changed by a relatively small control voltage.

Another object is to provide a novel means for controlling the voltage applied to an electrode of an oscillator tube thereby to vary the alternating current output voltage of the oscillator.

A further object of the invention is to provide a power supply of the type comprising an oscillator for generating a relatively high frequency current and a rectifier for rectifying the generated oscillations combined with a novel control for varying the voltage of the generated oscillations to thereby vary the voltage of the rectified direct current.

Still another object of the invention is to provide a novel and improved arrangement, for example, for maintaining a substantially fixed signal level, when "white" is being scanned, in a facsimile scanning system.

Still another object is to provide a novel signal level control embodying a phototube in combination with a controllable power supply for the phototube.

Other objects and advantages of the present invention will, of course, become apparent and immediately suggest themselves to those skilled in the art to which the invention is directed from a reading of the following specification in connection with the accompanying drawings in which.

Figures 1, 2, 3:
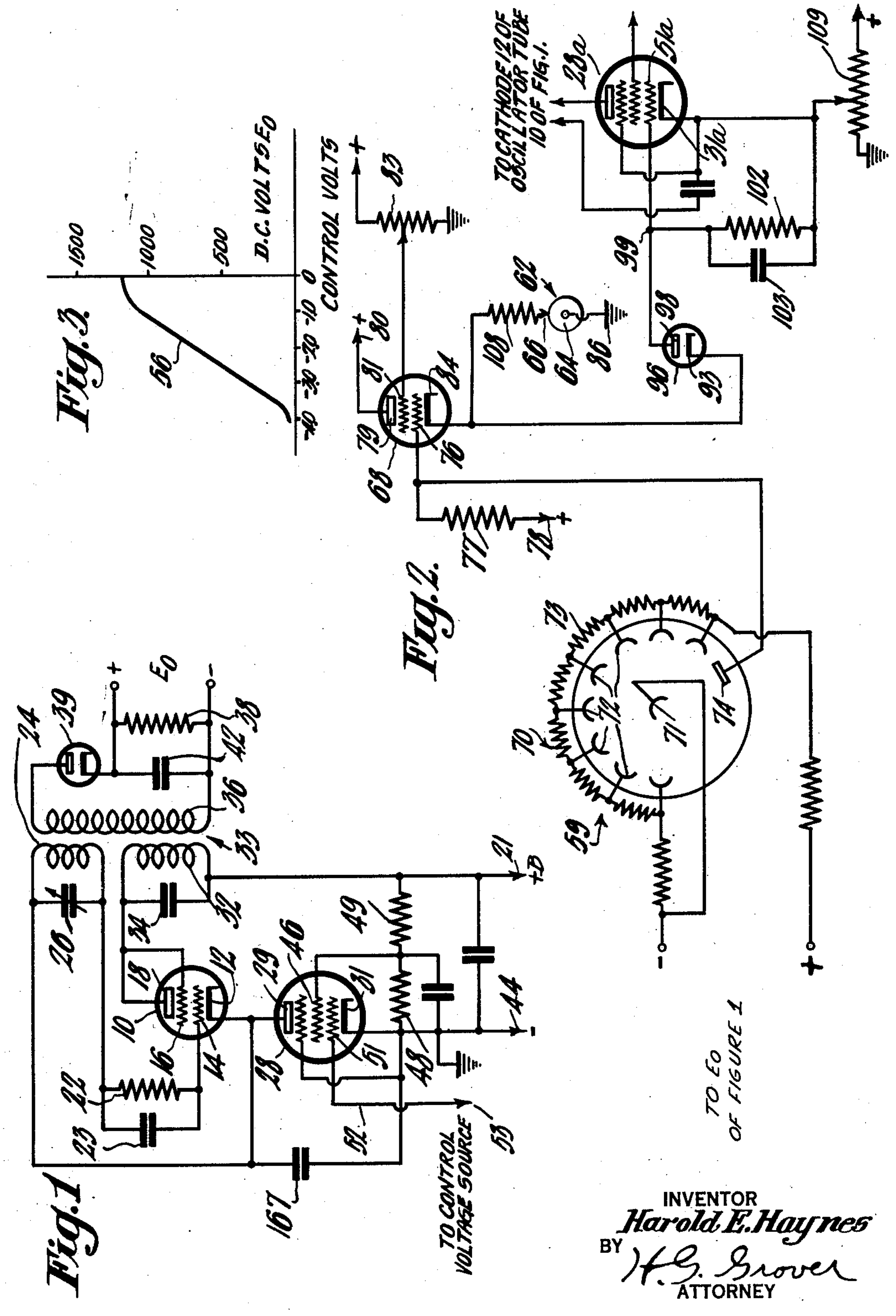
Fig. 1 is a schematic showing of a power supply system embodying the invention.
Fig. 2 illustrates, schematically, a facsimile system to be used in combination with the power supply of Fig. 1 to obtain automatic gain control.
Fig. 3 is a curve referred to in explaining the operation of the invention.

Referring to Fig. 1 of the drawings there is shown a tube 10 which functions as an oscillator. It comprises a cathode 12, a control grid 14, a screen grid 16 and an anode 18. The anode and screen electrodes are maintained at a positive direct current voltage from a direct current source (not shown) which may be connected at the terminal indicated schematically at 21. The control grid 14 is returned to the cathode 12 through a path including a grid resistor 22 shunted by a capacitance 23 and a feed-back or tickler coil 24. The latter is tuned by a variable capacitance 26. The cathode 12 of the tube 10 is connected effectively to ground through the space discharge path of a tube 28 which comprises an anode 29 and a cathode 31. The function and operation of the tube 28 will be described more in detail hereinafter. The anode circuit of the tube 10 includes a parallel resonant circuit which comprises the primary winding 32 of an output transformer 33. The primary winding 32 is tuned by a capacitance 34. The tickler coil 24, mentioned above, may be one of the windings of the transformer 33.

The secondary 36 of the transformer 33 is connected to a load resistor 38 through a diode rectifier 39. A capacitance 42 is shunted across the load resistor 38 to bypass the high frequency currents. The symbol $E_0$ represents the voltage available from the high voltage power supply source of the invention.

The oscillator comprising the tube 10 as well as the transformer 33 are shown by way of example. Oscillating circuits for the tube 10, other than those shown, and different transformer arrangements may be employed since details of these elements of the system are shown only by way of example. It will be understood that the coils 24, 32 and 36 are coupled magnetically and that this coupling with respect to one or all of the coils may be made adjustable if desired.

The space discharge path and hence the internal impedance of the tube 28 is in series with the anode circuit of the oscillator tube 10 to vary the effective plate supply voltage between its cathode 12 and its anode 18. The internal impedance of the tube 28 to alternating current is equal to its D. C. resistance, and would cause a large loss of high frequency power if the A. C. component of oscillator plate current flowed through it. Therefore, a capacitor 167 is connected in parallel with the internal impedance of tube 28 to provide a low impedance to high frequency current. The tube 28 preferably has a high transductance. By way of example, a type 6AG7 tube is suitable. The plate voltage supply source (not shown) for the oscillator tube 10 will have its negative terminal returned to ground, the connection being indicated schematically and designated by reference character 44.

The screen grid 46 of the tube 28 is connected to an appropriate point on a voltage divider comprising resistors 48 and 49. The control grid 51 of the tube 28 provides for controlling the output voltage $E_0$ and is made available for this purpose by the provision of a conductor and terminal, for example, shown schematically and indicated by reference characters 52 and 53, respectively.

Fig. 3 of the drawings indicates the degree of control of the developed D. C. voltage $E_0$ which may be obtained by varying the voltage on the signal grid 51 of the tube 28. The curve 56, which is plotted between voltage on the control grid 51 and D. C. voltage appearing across the load resistor 38, indicates a characteristic which is suitable for gain control in apparatus employing a photosensitive device such as an electron multiplier phototube. In applicant's copending application Serial No. 706,924 referred to above and also in applicant's copending application entitled "Gain control system for facsimile scanning," Serial No. 706,925, filed October 31, 1946, systems are disclosed in which the effective gain in a facsimile system is controlled upon scanning of the white background of subject copy in the facsimile scanner. The arrangement of Fig. 1 having the output characteristic of Fig. 3 has numerous advantages when incorporated in a facsimile scanning system to provide automatic gain control.

Fig. 2 of the drawings is illustrative of such a system embodying the present invention. Referring to Fig. 2, a phototube 59 is or may be a part of any well known optical facsimile scanner such, for example, as is shown in U. S. Patents Nos. 1,746,407 and 2,298,911 granted to F. Schroter et al. and C. J. Young on February 11, 1930, and October 13, 1942, respectively. The phototube 59 generates facsimile signals in a known manner which are utilized in a recorder, indicated schematically at 62, comprising a helical electrode (not shown) on the drum 64 and a printer bar 66. A recorder of this general type is shown in U. S. Patent No. 2,391,765 granted to Maurice Artzt on December 25, 1945. The transmitter-scanner and the recorder may be combined mechanically and may be of the type shown in U. S. Patent No. 2,354,571 granted on July 25, 1944, to Albert Blain and may include the mechanical refinements shown in this patent and the other patents cited therein.

In the example of Fig. 2 the phototube 59 drives the output stage or tube 68 directly. It will be understood that other arrangements may be employed, for example that shown in my copending application referred to above and identified as bearing Serial No. 706,925. The electron multiplier phototube 59 may, for example, be the commercially available type 931-A multiplier phototube which is of the electrostatically focussed type. The photocathode 71 of the phototube 59 is connected, for purposes of this aspect of the invention, to the negative terminal of the high voltage power supply of Fig. 1. This terminal is the negative end of the load resistor 38. For the type of phototube mentioned by way of example, the voltage across the terminals of the power supply source is to be approximately 700 volts.

Automatic gain control in accordance with the invention is accomplished by varying the total voltage supplied to the dynodes 72 of the phototube 59. The gain of an electron multiplier can be varied through a wide range in this manner. The dynodes 72 are connected to spaced points along a voltage divider 70 made up of the resistors 73. The anode 74 of the phototube is connected to the signal grid 76 of the output tube 68. The signal grid 76 is connected through a resistor 77 to a D. C. source of positive voltage indicated by the reference character 78. The anode 79 of the output tube 68 is connected to a suitable D. C. source of positive voltage as indicated by the reference character 80. The screen grid 81 of this tube is connected to an adjustable D. C. source of positive voltage as indicated diagrammatically at 83.

The cathode 84 of the output tube 68 is connected through a resistor 108 to the printer bar 66 (indicated schematically by an arrowhead), and the helix (not shown) on the drum 64 is connected to any suitable metallic part of the recorder to be grounded thereby as indicated at 86. The cathode 84 at which the output voltage of the circuit appears is also connected to the cathode 93 of a diode 96, and the connection to the anode 98 of this diode is designated 99. The tube 28*a* of Fig. 2 corresponds to the tube 28 of Fig. 1 and performs the same function. The terminal 99 is continued to the control grid 51*a* of the tube 28*a*. The control grid 51*a* of the tube 28*a* is also connected to the cathode 31*a* through a resistor 102 shunted by a capacitor 103. For the invention in this form the cathode 31*a* of the control tube 28*a* is not connected directly to ground, as shown in Figure 1 for the tube 28, but to an adjustable source of positive D. C. voltage 109. The voltage 109 is to be adjusted to a value equal to the sum of the output voltage (at the cathode 84) which exists when the desired "white" background is being recorded, plus a voltage equal to the normal operating grid bias of the control tube 28*a*.

Assume a condition wherein white is being scanned and the overall gain of the system is not great enough to provide white copy at the recorder but causes the recorder to record gray copy. Under these circumstances the cathode 84 of the tube 68 and hence the cathode 93 of the tube 96 is at some moderately high positive value constantly. Therefore, no current can flow through the diode 96, and the grid 51*a* of the control tube 28*a* will tend to assume the same potential as its cathode 31*a*. This would represent a condition of high voltage output across the photomultiplier divider 70 and hence maximum gain. However, as soon as the gain rises sufficiently to cause the output voltage at the cathodes 84 and 93 to be reduce to a value less positive than the voltage existing at the anode 98, current will flow through the diode 96 and hence through the resistor 102, establishing a negative bias on the grid 51*a* of tube 28*a* which will in turn reduce the overall gain. The large resistor 102 is shunted by a relatively large capacitor 103 so that when no current is flowing through the diode 96, the control voltage cannot change rapidly. This condition exists when anything except white is being scanned, and thus allows the gain to tend slowly upward under these conditions. When white is scanned, current flows through diode 96, and the rapidity with which this white signal can change the control voltage and hence adjust gain is determined by the capacity of capacitor 103 and the resistance of the path including diode 96, resistor 108, and the recorder circuit proper. Timing in this case is made as fast as possible, so that a white signal of short duration can promptly adjust gain to the desired value. Due to the slow timing of resistor 102 and capacitor 103, this gain condition will be maintained for a relatively long time, and the net result is that a small amount of white scanned during each line excursion of the scanner will suffice to keep the gain constant and at the proper value at all times.

Having now described the invention, what is claimed and desired to be secured by Letters Patent is the following:

1. A facsimile system comprising a scanner having means including an electron multiplier phototube for generating signals representing scanning of subject matter, an output circuit for said phototube including a resistor, an electron tube comprising a cathode, an anode, and a control electrode, said control electrode being coupled to said output circuit, a facsimile recorder subject at times to short circuit, a cathode circuit for said tube including the active circuit of said recorder, a resistor in said cathode circuit, a a control tube for said system, and means for coupling said cathode to said control tube.

2. A facsimile system comprising a scanner having means including an electron multiplier phototube for generating signals representing scanning of subject matter, an output circuit for said phototube including a resistor, an electron tube comprising a cathode, an anode, and a control electrode, said control electrode being coupled to said output circuit, a facsimile recorder subject at times to short circuit, a cathode circuit for said tube including the active circuit of said recorder, a resistor in said cathode circuit, a power supply for said phototube, a control tube for said power supply, and means for coupling said cathode to said control tube.

3. A facsimile system comprising a scanner having means including an electron multiplier phototube for generating signals representing scanning of subject matter, an output circuit for said phototube including a resistor, an electron tube comprising a cathode, an anode, and a control electrode, said control electrode being coupled to said output circuit, a facsimile recorder subject at times to short circuit, a cathode circuit for said tube including the active circuit of said recorder, a resistor in said cathode circuit, a control tube for said system comprising at least a cathode, an anode and a control electrode, and means for coupling the cathode of said first named tube to said control tube electrode.

4. A facsimile system comprising a scanner having means including an electron multiplier phototube for generating signals representing scanning of subject matter, an output circuit for said phototube including a resistor, an electron tube comprising a cathode, an anode, and a control electrode, said control electrode being coupled to said output circuit, a facsimile recorder subject at times to short circuit, a cathode circuit for said tube including the active circuit of said recorder, a resistor in said cathode circuit, a diode rectifier having a cathode and an anode, a connection from the cathode of said first named tube to said diode cathode, a control tube for said syster having a control electrode, a connection from said control electrode to said diode anode, and a parallel combination of a resistance and capacitance connected between the control electrode of said control tube and the cathode of said control tube.

HAROLD E. HAYNES.

REFERENCES CITED

The following references are of record in the file of this patent:

UNITED STATES PATENTS

| Number | Name | Date |
|---|---|---|
| 2,158,193 | Morse | May 16, 1939 |
| 2,205,072 | Skellet | June 18, 1940 |
| 2,257,942 | Farnsworth | Oct. 7, 1941 |
| 2,280,303 | Reynolds | Apr. 21, 1942 |
| 2,302,876 | Malling | Nov. 24, 1942 |
| 2,315,362 | Wise | Mar. 30, 1943 |
| 2,352,988 | Wilcox | July 4, 1944 |
| 2,395,102 | Cawein | Feb. 19, 1946 |
| 2,396,023 | Schartz | Mar. 5, 1946 |
| 2,404,098 | Schade | July 16, 1946 |
| 2,431,511 | Sanders | Nov. 25, 1947 |
| 2,454,169 | Haynes | Nov. 16, 1948 |